United States Patent
Iacob

(10) Patent No.: US 7,602,158 B1
(45) Date of Patent: Oct. 13, 2009

(54) POWER CIRCUIT FOR GENERATING NON-ISOLATED LOW VOLTAGE POWER IN A STANDBY CONDITION

(75) Inventor: Alin Theodor Iacob, Sunnyvale, CA (US)

(73) Assignee: National Semiconductor Corporation, Santa Clara, CA (US)

(*) Notice: Subject to any disclaimer, the term of this patent is extended or adjusted under 35 U.S.C. 154(b) by 258 days.

(21) Appl. No.: 11/086,215

(22) Filed: Mar. 21, 2005

(51) Int. Cl.
*H02M 7/06* (2006.01)

(52) U.S. Cl. .................... 323/231; 363/126; 307/17

(58) Field of Classification Search ............... 323/231, 323/220, 267, 223, 233, 266; 361/91.5; 307/33, 307/12, 38, 30; 363/126
See application file for complete search history.

(56) References Cited

U.S. PATENT DOCUMENTS

| | | | | |
|---|---|---|---|---|
| 4,910,654 A | * | 3/1990 | Forge | 363/49 |
| 4,958,121 A | * | 9/1990 | Cuomo et al. | 323/224 |
| 5,744,944 A | * | 4/1998 | Danstrom | 323/284 |
| 5,939,803 A | * | 8/1999 | Frost | 307/126 |
| 5,994,882 A | * | 11/1999 | Ma | 323/222 |
| 6,028,755 A | * | 2/2000 | Saeki et al. | 361/91.1 |
| 6,104,622 A | | 8/2000 | Shin | 363/21 |
| 6,147,935 A | * | 11/2000 | Guyett et al. | 368/204 |
| 6,184,660 B1 | * | 2/2001 | Hatular | 320/141 |
| 6,407,840 B1 | | 6/2002 | Shien-Te et al. | 359/142 |
| 6,430,062 B1 | | 8/2002 | Shin | 363/21.01 |
| 6,476,589 B2 | * | 11/2002 | Umminger et al. | 323/282 |
| 6,489,725 B1 | | 12/2002 | Suzuki et al. | 315/159 |
| 6,636,146 B1 | * | 10/2003 | Wehoski | 340/10.4 |
| 6,678,173 B2 | | 1/2004 | Nakagawa | 363/44 |
| 2002/0118552 A1 | | 8/2002 | Nakagawa | 363/20 |
| 2003/0214819 A1 | | 11/2003 | Nakagawa | 363/20 |

OTHER PUBLICATIONS

LT1009 Datasheet, Texas Instruments, Mar. 2002, SLVS013H, pp. 1 and 6.*

* cited by examiner

*Primary Examiner*—Adolf Berhane
*Assistant Examiner*—Harry Behm

(57) ABSTRACT

A power circuit generating a non-isolating low voltage power supply using a capacitive AC voltage drop in standby. Specifically, the power circuit includes an AC connector that generates a first AC input and a second AC input that are opposite in phase. The power circuit also includes first and second diode bridge rectifier circuits that are coupled to the first AC input, the second AC input, and a ground. A first capacitor drops a voltage of the first AC input, and a second capacitor drops a voltage of the second AC input. The first diode bridge rectifier circuit provides a high voltage power signal to a load. The second diode bridge rectifier circuit provides a low voltage power signal to a microcontroller.

15 Claims, 11 Drawing Sheets

US 7,602,158 B1

POWER CIRCUIT FOR GENERATING NON-ISOLATED LOW VOLTAGE POWER IN A STANDBY CONDITION

BACKGROUND OF THE INVENTION

1. Field of the Invention

Embodiments of the present invention relate to the field of power circuits. More particularly, embodiments of the present invention relate generally to power circuits that generate low voltage power in standby conditions.

2. Related Art

Electronic devices are built to accept control signals even in a standby condition. That is, although the electronic device is turned off, the device is placed in standby condition. From the standby condition, the electronic device consumes power while waiting to accept a control signal that, for example, starts up a switching power supply circuit. The power is consumed by the logic waiting for the control signal, displays (e.g., light emitting diode [LED] monitors), etc.

Unfortunately, the standby energy consumption of the electronic device may be as high as ten percent of the total energy consumption of the device, especially when the electronic device spends a majority of its operating lifetime in a standby condition. The rate at which energy is transferred or converted is power, wherein the unit of power is the watt (1 watt is the rate of energy transfer of 1 joule per second). As such, the electronic device consumes a significant amount of power just waiting for a control signal when in the standby condition. For example, any electronic device may consume upwards of three to twelve watts of power in the standby condition.

This standby power consumption can quickly add up for a particular household, for example, when considering the number of electronic devices that can be in standby condition at one time. For instance, electronic devices that consume power in a standby condition include, but are not limited to, televisions, DVD players, washer and dryers, appliances, garage door openers, personal computers, printers, unloaded chargers, etc.

Prior Art FIG. 1 is a diagram of a power circuit 100 that generates a high voltage output in tandem with a low voltage output using a resistive voltage drop and a shunt regulator. A high alternating current (AC) voltage (e.g., 110 or 220 volts AC) is applied at a connector 110. The diode bridge 120 rectifies the AC voltage from the connector 110 to a direct current (DC) voltage. The capacitor 130 filters the DC voltage to reduce the ripple to an acceptable level. The high DC voltage is presented on connector 140.

The power circuit 100 generates a low voltage from a high DC voltage through the use of resistor 150. This low voltage is stabilized through a zener diode 160. The low voltage is presented to connector 190. However, the use of a resistor to drop the voltage results in a high power loss through the resistor 150. This power loss is greater than the recommendations issued by the regulatory agencies in the United States and Europe, for example. For instance, the power consumed by the power circuit 100 is greater than 1 watt when the connector 190 is loaded.

Prior Art FIG. 2 is a diagram of a power circuit 200 that generates a high voltage output in tandem with a low voltage output using a resistive voltage drop and a shunt regulator. A high AC voltage (e.g., 110 or 220 volts AC) is applied at a connector 210. The diode bridge 220 rectifies the AC voltage from the connector 210 to a DC voltage. The capacitor 230 filters the DC voltage to reduce the ripple to an acceptable level. The high DC voltage is presented on connector 240.

The power circuit 200 generates a low voltage from a high DC voltage through the use of resistor 250. This low voltage is stabilized through a zener diode 260. In addition, a linear regulator integrated circuit 270 is included to improve the regulation of the low voltage power signal by stabilizing the low voltage power signal presented to connector 290. However, the power circuit 200 suffers from the same power consumption inefficiency as the power circuit 100 of Prior Art FIG. 1. Specifically, the power dissipated through resistor 250 is too great, and the power consumed by the power circuit 200 is greater than 1 watt when the connector 290 is loaded.

Prior Art FIG. 3 is a diagram of a power circuit 300 that is capable of generating a high power output in tandem with a low power output using a transformer and a series linear regulator. A high AC voltage (e.g., 110 or 220 volts AC) is applied at a connector 310. The diode bridge 320 rectifies the AC voltage from the connector 310 to a DC voltage. The capacitor 330 filters the DC voltage to reduce the ripple to an acceptable level. The high DC voltage is presented on connector 340.

The power circuit 300 generates low voltage by employing a step down transformer 350. The diode bridge 360 rectifies the AC voltage from the step down transformer 350. A linear regulator 370 is used to stabilize the voltage from the diode bridge 360 that is presented to the connector 390. The power circuit 300 is more efficient than the power circuits 100 and 200 of FIGS. 1 and 2, respectively. However, the power circuit 300 is more expensive to implement since a step-down transformer 350 is used to lower the voltage down to an acceptable level. In addition, the use of the step-down transformer 350 is bulky and may unnecessarily increase the size of the power circuit 300.

Prior Art FIG. 4 is a diagram of a conventional power circuit 400 of a switching power supply that is capable of generating a low power output through a resistive voltage drop. A high AC voltage (e.g., 110 or 220 volts AC) is applied at a connector 410. The diode bridge 420 rectifies the AC voltage from the connector 410 to a DC voltage. The capacitor 430 filters the DC voltage to reduce the ripple to an acceptable level. The high DC voltage is presented to a transformer 440 that steps up or down the DC voltage as applied to the system 450. Various stepped up or down voltages (e.g., Va, Vb, and Vc) can be applied to the system 450.

The power circuit 400 generates low voltage by employing a step down secondary winding 480 on transformer 440. As such, the isolation transformer 440 is always on. In addition, the low voltage is applied to a microcontroller 490 on the low side of the circuit 400. The use of the auxiliary transformer secondary winding 480 is expensive and bulky, thereby introducing the inefficiencies of the power circuit 300 of FIG. 3.

Moreover, the power circuit 400 includes a power management (PWM) controller 460 that adjusts the duty factor of the pulses presented on the gate of transistor 470. In order to start the power circuit 400 to apply power to the system 450, the resistor 475 injects a current necessary to get the PWM controller 460 to turn on. However, most of the voltage is dropped through the resistor 475. This resistor 475 drops the high voltage (e.g., 100 to 400 volts) from the output of the diode bridge 420 to a lower value (e.g., 6-36 volts). Unfortunately, the use of a resistor to drop the voltage results in a high power loss through the resistor 475. As such, the power circuit 400 suffers from the same inefficiencies as the power circuit 100 and 200 of Prior Art FIGS. 1 and 2, respectively.

During the operation of the power circuit 400 in presenting high voltage to the system 450 a larger current is needed in order to drive the gate of transistor 470. This additional current can be achieved through an auxiliary winding of the transformer 480, diode 482, and capacitor 484 to rectify and filter the AC voltage generated by the auxiliary winding of transformer 480.

Although most of the energy required to keep PWM controller 460 running is sourced from the auxiliary transformer 480, the resistor 475 still dissipates a significant amount of power. To reduce this loss through resistor 475, the power circuit 400 can be improved by disconnecting resistor 475 after the power supply in power circuit 400 is started. This is possible, for example by adding a high voltage PNP transistor in series with resistor 475 and an NPN transistor in a Darlington connection with the PNP transistor. In addition, there is a need to control this Darlington circuit during power up and possible brown-outs. These additional elements further complicate the power supply and render the power circuit 400 too expensive for consumer type applications.

As such, there is a need for a power circuit that is capable of generating a low voltage power supply that is significantly less than one watt for an electronic device in a standby condition.

SUMMARY OF THE INVENTION

Accordingly, various embodiments of the present invention disclose a power circuit that generates non-isolating low voltage power in standby conditions. Embodiments of the present invention are able to generate a low voltage power supply that is significantly lower than 1 watt (e.g., less than 0.3 watts) in tandem with a high voltage output. In many cases, a lower voltage and lower power level output is required in tandem with a high voltage output for a power circuit that provides power to an electronic device. The lower voltage may be required, for example to start-up the switching power supply circuit from a standby condition.

Specifically, in one embodiment, a power circuit is described that generates a non-isolating low voltage power supply using an AC voltage drop in standby. The power circuit includes an AC connector that generates a first AC input and a second AC input that are opposite in phase. The power circuit also includes a first diode bridge rectifier circuit coupled at separate nodes to the first AC input, the second AC input, and a ground. The first diode bridge rectifier circuit at a first output node provides a high voltage power signal to a load. In addition, the power circuit also includes a second diode bridge rectifier circuit coupled at separate nodes to the first AC input, the second AC input, and the ground. The second diode rectifier at a second output node provides a low voltage power signal to a microcontroller. The power circuit also includes first and second capacitors. The first capacitor is coupled in series with the first AC input and a first node of the second diode bridge rectifier circuit and reduces a voltage of the first AC input. The second capacitor is coupled in series with the second AC input and a second node of the second diode bridge rectifier circuit and drops a voltage of the second AC input.

In another embodiment, a power circuit is described that generates non-isolated low voltage power in standby. The power circuit includes an AC connector that generates a first AC input and a second AC input that are opposite in phase. The power circuit also includes a high voltage power circuit that is coupled to the first AC input, the second AC input, and a ground. The high voltage power circuit generates a high voltage power signal that is applied to a load. The power circuit also includes a diode bridge rectifier circuit coupled at separate nodes to the first AC input, the second AC input, and the ground. The diode bridge rectifier circuit at an output node provides a low voltage power signal to a microcontroller. The power circuit also includes first and second capacitors. The first capacitor is coupled in series with the first AC input and a first node of the diode bridge rectifier circuit and reduces a voltage of the first AC input. The second capacitor is coupled in series with the second AC input and a second node of the second diode bridge rectifier circuit and drops a voltage of the second AC input. In addition, the power circuit also includes a switching shunt regulator circuit that is coupled to the first output node and to ground. The switching shunt regulator circuit controls power of the low voltage power signal that is applied to the microcontroller.

BRIEF DESCRIPTION OF THE DRAWINGS

Prior Art

Prior Art

Prior Art

Prior Art

DETAILED DESCRIPTION OF THE INVENTION

Reference will now be made in detail to the preferred embodiments of the present invention, a power circuit for generating a non-isolated low voltage power supply in standby conditions, examples of which are illustrated in the accompanying drawings.

Accordingly, various embodiments of the present invention disclose a power circuit that generates a non-isolating low voltage power supply in standby. Embodiments of the present invention are able to generate a low voltage power supply that is significantly lower than 1 watt in tandem with a high voltage output. In many cases, a lower voltage and lower power level output is required in tandem with a high voltage output for a power circuit that provides power to an electronic device. The lower voltage may be required, for example to start-up the switching power supply circuit from a standby condition.

Embodiments of the present invention can be implemented on any electronic system running in standby mode. The electronic system can be a computer system, an embedded system, a personal computer, notebook computer, handheld computer, appliances, garage door openers, digital video disk (DVD) player, workstation, and the like.

Figure 5:
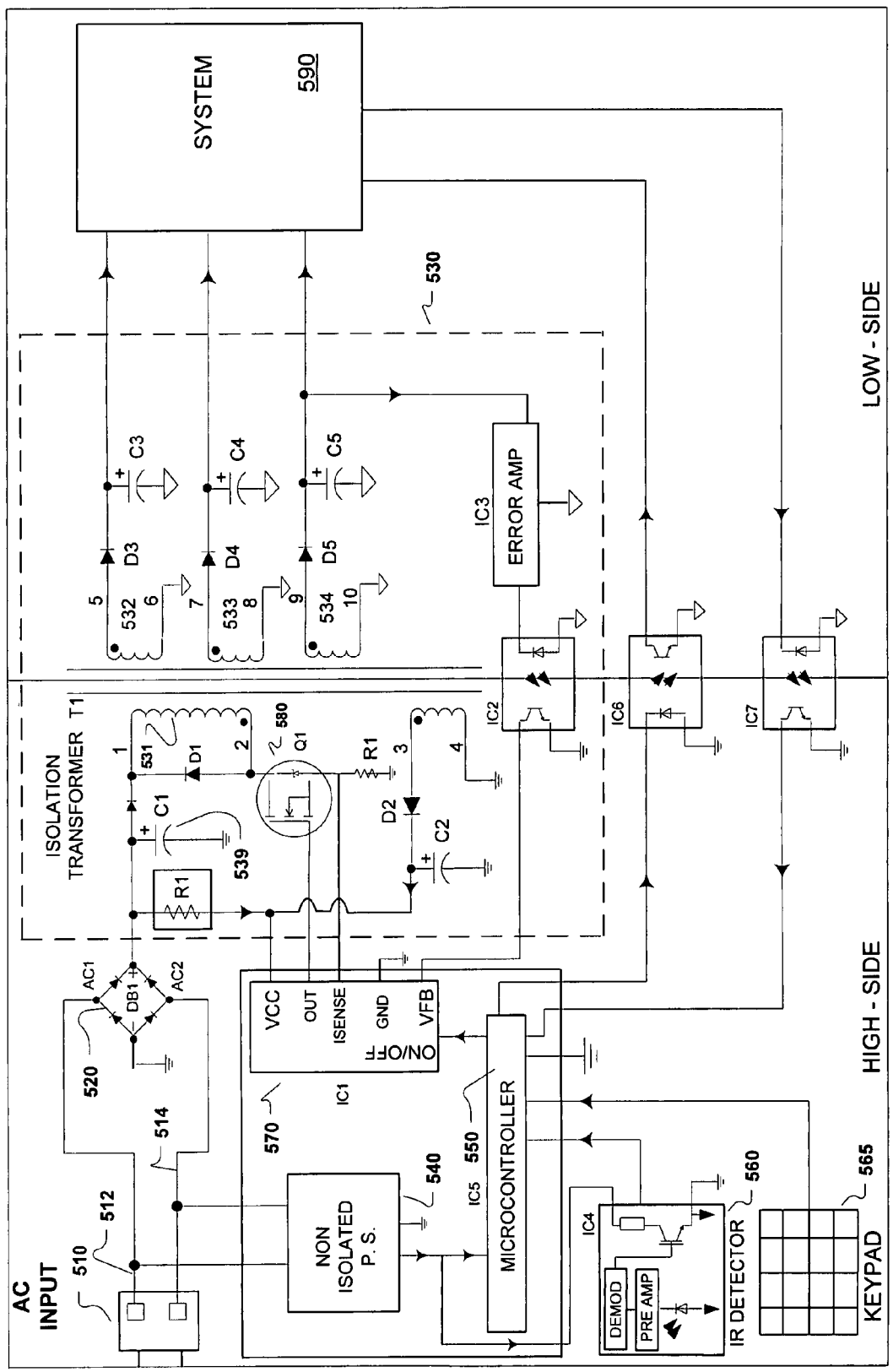
FIG. 5 is a schematic diagram of a power circuit that implements a system standby with a non-insulated high-side microcontroller that is powered from a non-insulated power supply, in accordance with one embodiment of the present invention.

Turning now to FIG. 5, a schematic diagram of a power circuit 500 is shown that is capable of generating a non-isolated low voltage power supply in a standby condition, in accordance with one embodiment of the present invention. More particular, the power circuit 500 implements a system standby with a non-insulated high-side microcontroller that is powered from a non-insulated power supply.

In the power circuit 500, a high alternating current (AC) voltage (e.g., 110 or 220 volts AC) is applied at a connector 510. The connector 510 generates a first AC input 512 and a second AC input 514. The second AC input 514 configured such that it is opposite in phase from the first AC input 512.

The power circuit 500 includes a diode bridge rectifier circuit 520 that rectifies the AC voltages from the connector 510 to a direct current (DC) voltage. The diode bridge rectifier circuit is coupled at separate nodes to the first AC input 512, the second AC input 514 and a ground. For instance, the node in the diode bridge rectifier circuit 520 that is coupled to the first AC input 512 is separated from the node in the diode bridge rectifier circuit 520 that is coupled to the second AC input 514 by two diodes.

A capacitor 539 filters the DC voltage to reduce the ripple to an acceptable level. The high DC voltage is presented to the high power circuit 530 that generates a high voltage power signal for the system 590. For example, the high power circuit 530 includes an isolation transformer 531 that steps up or down the DC voltage. This stepped up/down voltage is applied to the system 590. Various stepped up/down voltages can be generated by the separate transformer circuits 532, 533, and 534.

In addition, the power circuit 500 includes a non-isolated power supply 540 that is also coupled to the first AC input 512, the second AC input 514, and the ground. That is, there is feedback between the non-isolated power supply 540 and the diode bridge rectifier circuit 520. The power supply 540 is not isolated from the connector 510 that generates the AC input signals. In addition, the non-isolated power supply generates at an output node a low voltage power signal in tandem with the high voltage signal generated by the high power output circuit 530.

In the present embodiment, the power circuit 500 also includes a microcontroller 550 that is coupled to the non-isolated power supply 540. The microcontroller is coupled to the output node of the non-isolated power supply to receive low voltage power so that the microcontroller 550 can operate during standby conditions. In addition, the microcontroller 550 is located on the high side of the power circuit 500.

The microcontroller 550 controls the application of a high voltage DC signal from the diode bridge rectifier circuit 520 to the high power circuit 530 in response to an external control signal as received through the detector 560 (e.g., infrared detector). That is, the microcontroller 550 receives control signals through the detector 560 (or from keypad 565) during the standby condition to power on the high power circuit 530. For example, an ON control signal directs the microcontroller 550 to turn on the high power circuit 530. Conversely, an OFF control signal directs the microcontroller to turn off the high power circuit 530.

In the present embodiment, the power circuit 500 also includes a power management circuit 570 that is coupled to the microcontroller 550. The power management circuit controls the application of the high voltage DC signal from the diode bridge rectifier circuit 520 to the high power circuit 530.

That is, when the microcontroller 550 directs the power management circuit 570 to shut down the system 590, the power management circuit 570 turns off the control transistor 580. This entirely shuts down the isolation transformer 531. More specifically, the high voltage DC signal from the diode bridge rectifier circuit 520 is decoupled from the high power circuit 530 and no power is applied to the system 590 through the isolation transformer 531 of the high power circuit 530. More specifically, when the system 590 is ON, the transistor 580 works as a chopper by switching ON and OFF at a high speed (e.g., 50-500 kHz) to operate the transformer 531. When the system 590 is OFF, the transistor 580 is completely off.

Conversely, when the microcontroller 550 directs the power management circuit 570 to power up the system 590, the power management circuit 570 turns on the control transistor 580. That is, the power management circuit 570 enables the pulses on the gate of the transistor 580. This entirely enables the isolation transformer 531. More specifically, the high voltage signal from the diode bridge rectifier circuit 520 is coupled to the high power output circuit 530 and power is applied to the system 590 through the isolation transformer 531 of the high power circuit 530.

In addition, the microcontroller includes additional logic (not shown) for determining if the external control signal is not an on/off control signal, in one embodiment. In the case where the logic determines that the control signal is intended for system 590, and is not a TURN ON or TURN OFF signal, then the microcontroller 550 passes the control signal directly to the system 590 through the integrated circuits IC6 or IC7, for example.

Figure 6:
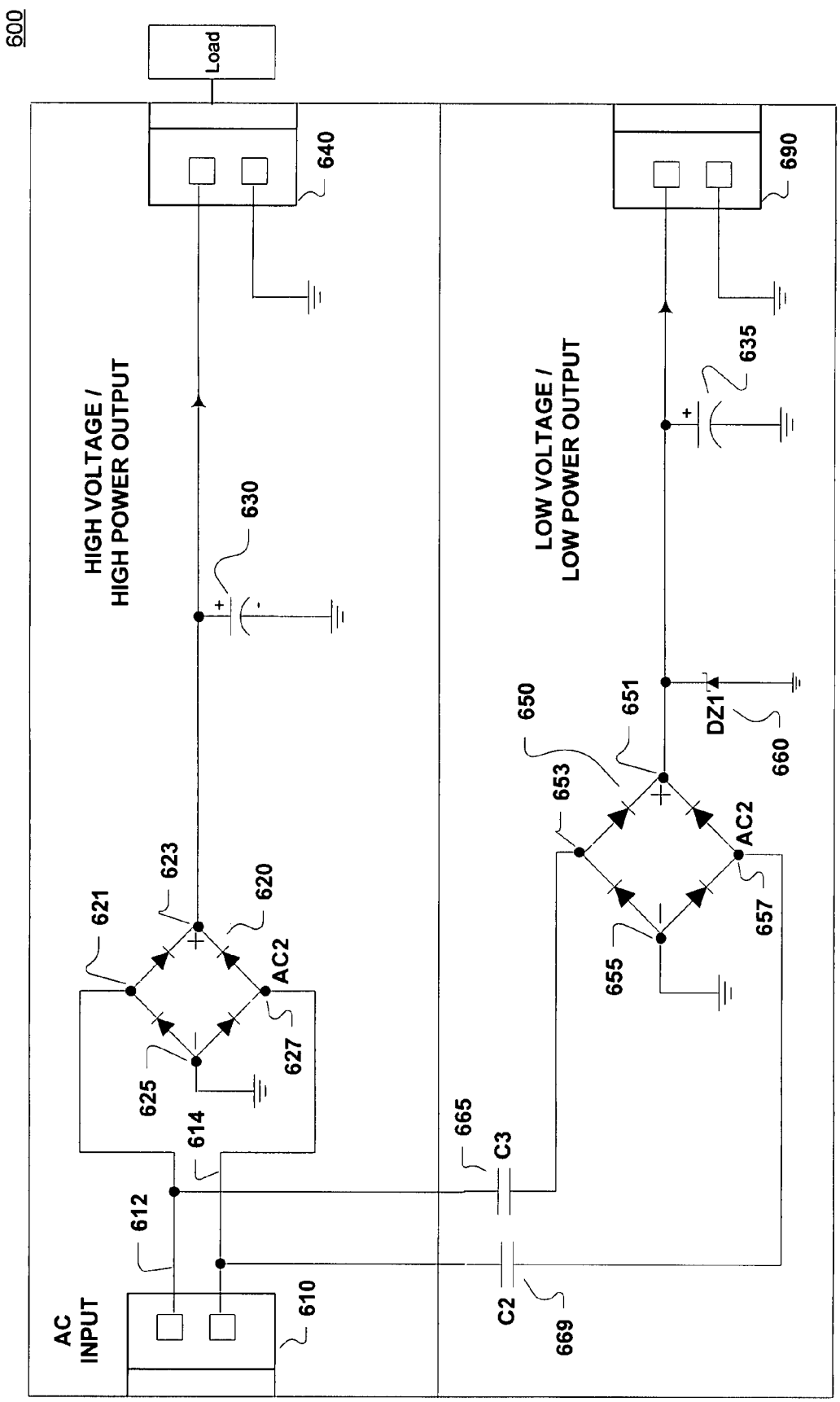
FIG. 6 is a schematic diagram of a power circuit 600 that is capable of generating low voltage power from a non-isolating low voltage power supply during standby conditions, in accordance with one embodiment of the present invention.

FIG. 6 is a schematic diagram of a power circuit 600 that is capable of generating low voltage power from a non-isolating low voltage power supply during standby conditions, in accordance with one embodiment of the present invention. In many cases, a lower voltage and lower power level output is required in tandem with the high voltage output (typically also high power) generated for operating the electronic system. The lower voltage may be required, for example, to start-up the switching power supply circuit.

In the power circuit 600, a high alternating current (AC) voltage (e.g., 110 or 220 volts AC) is applied at a connector 610. The connector 610 generates a first AC input 612 and a second AC input 614. The second AC input 614 configured such that it is opposite in phase from the first AC input 612.

The power circuit 600 includes a diode bridge rectifier circuit 620 that rectifies the AC voltages from the connector 610 to a direct current (DC) voltage. The diode bridge rectifier circuit 620 is coupled at separate nodes to the first AC input 612, the second AC input 614 and a ground. For instance, the node in the diode bridge rectifier circuit 620 that is coupled to the first AC input 612 is separated from the node in the diode bridge rectifier circuit 620 that is coupled to the second AC input 614 by two diodes.

The first diode bridge rectifier circuit 620 outputs a high DC voltage. An optional capacitor 630 filters the DC voltage to reduce the ripple to an acceptable level. The high DC voltage is presented to a connector 640 that is coupled to a load. That is, the connector 640 provides a high voltage power signal to a load, for example a switching power supply.

In addition, the power circuit 600 also includes a low voltage power circuit that includes a second diode bridge rectifier circuit 650, capacitor 669 and capacitor 665. In one embodiment, the low voltage power circuit comprises the non-isolated power supply 540 of FIG. 5. The low voltage power circuit produces a low voltage signal at the connector 690.

The second diode bridge rectifier circuit 650 is coupled at separate nodes to the first AC input 612, the second AC input 614, and to ground. The second diode bridge rectifier circuit 650 is used to rectify the AC signals from the connector 610. More particularly, the first AC input 612 is coupled to node AC1 in diode bridge rectifier circuit 650 through a capacitor 665. The capacitor 665 is used as a reactive element to drop the voltage of the first AC input 612 to a lower level. Also, the second AC input 614 is coupled to node AC2 in the diode bridge rectifier circuit 650 through a capacitor 669. The capacitor 669 is used as a reactive element to drop the voltage of the second AC input 614 to a lower level.

The output of diode bridge rectifier circuit at output node 651 is a DC voltage. An optional capacitor 635 filters the DC voltage to reduce the ripple to an acceptable level. The DC voltage is applied as a low voltage power signal to the connector 690 (e.g., to supply a controller).

The power circuit 600 also includes an optional zener diode coupled to the output node 651 and to ground, in one embodiment. The present embodiment uses the zener diode as a shunt regulator to stabilize the DC voltage presented to the connector 690. For instance, the zener diode 660 is used to clamp the low DC voltage at the output node 651. At the same time, the zener diode 660 also protects the circuitry connected to the connector 610 from high voltage spikes in case the load on connector 640 is very low.

Figure 9:
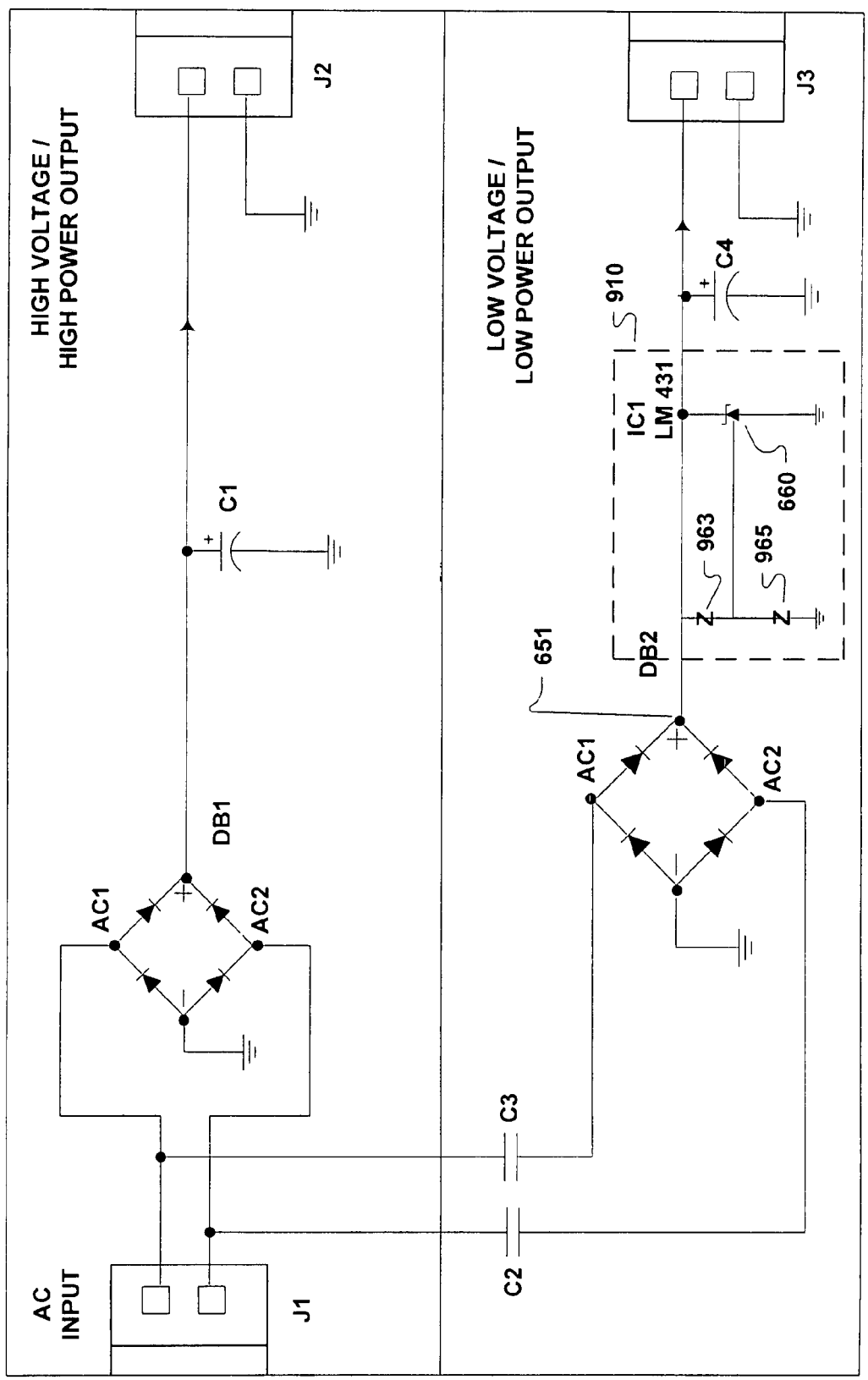
FIG. 9 is a schematic diagram of a power circuit 900 that is capable of generating a high power output in tandem with a low power output using a capacitive voltage drop and a programmable zener diode, in accordance with one embodiment of the present invention.

In another embodiment, an optional voltage divider is used to adjust the voltage at which the zener diode 660 clamps the output voltage at node 651, as is described in conjunction with the discussion of FIG. 9.

In the power circuit 600, the top half of the circuit producing the high voltage output at connector 640 interacts with the lower half of the circuit producing the low voltage output at connector 690. The top half of the power circuit 600 interacts with bottom half of the power circuit 600 since the diode bridge rectifier 620 and the diode bridge rectifier 651 share the same ground.

In one embodiment, the AC voltage presented at the connector 610 produces a first AC input 612 that is positive and a second AC input 614 that is negative. The top half of the power circuit 600 conducts current through the following components: from the AC input 612, to node 621, to output node 623, to capacitor 630, to ground, to node 655, to node 657 and to connector 610 at the AC input 614. The bottom half of the power circuit 600 conducts current as follows: from AC input 612, to capacitor 665, to node 653, to output node 651, through zener diode 660, to ground, to node 655, to node 657, to the AC input 614. In addition, the bottom half of the power circuit 600 can also conduct through a shorter alternate route through which current will flow, as follows: from AC input 612, to capacitor 665, to node 653, to node 651, through zener diode 660 to ground, to node 625, to node 627, and to AC input 614.

Since the alternate path is shorter, the power circuit will close on the alternate path. Therefore the voltage drop on capacitor 669 will be equal to the voltage drop of the diodes of the bridge rectifier circuit 620. Any previously stored charge on the capacitor 669 will be discharged to a level equal to one diode drop of the diode bridge rectifier circuit 620 less the drop of one diode of the diode bridge rectifier circuit 650.

In another embodiment, assuming the AC voltage presented at AC input 612 is negative and that the AC input 614 is positive, the process is similar to that described above. In addition, the capacitors 669 and 665 will charge to a maximum level of the peak voltage of the AC input 614 when the AC input 614 is positive. Also, the capacitors 669 and 665 will charge to a very low negative voltage of one diode drop (approximately 0.6 volts) on the negative polarity, when AC input 614 is negative. As such, the capacitors 669 and 665 are subject to a variable DC voltage that peaks at the maximum AC input and has a minimum of approximately zero.

Figure 1:
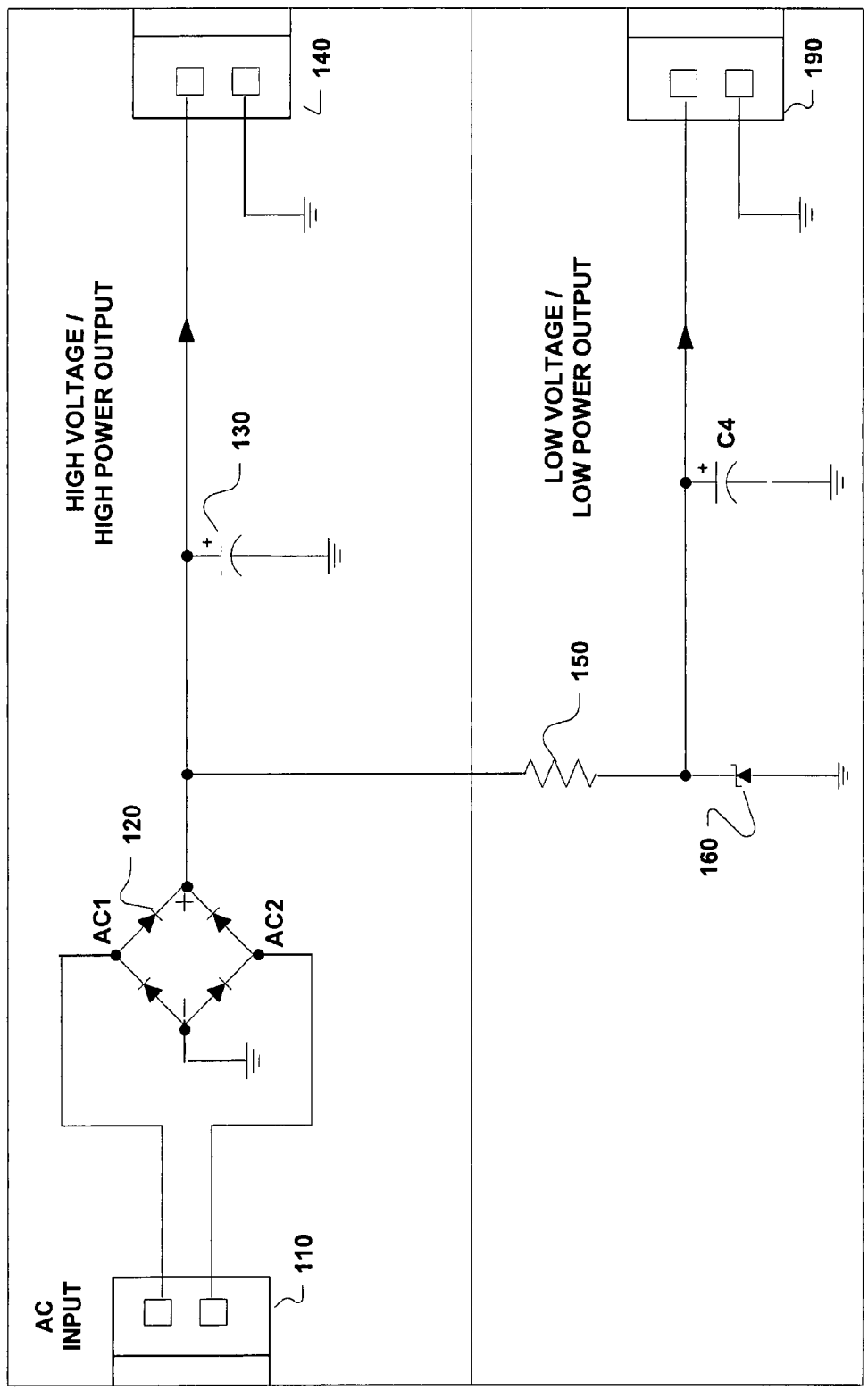
FIG. 1 is a schematic diagram of a conventional power circuit that generates a high-voltage output in tandem with a low-voltage output using a resistive voltage drop and a shunt regulator.
Figure 2:
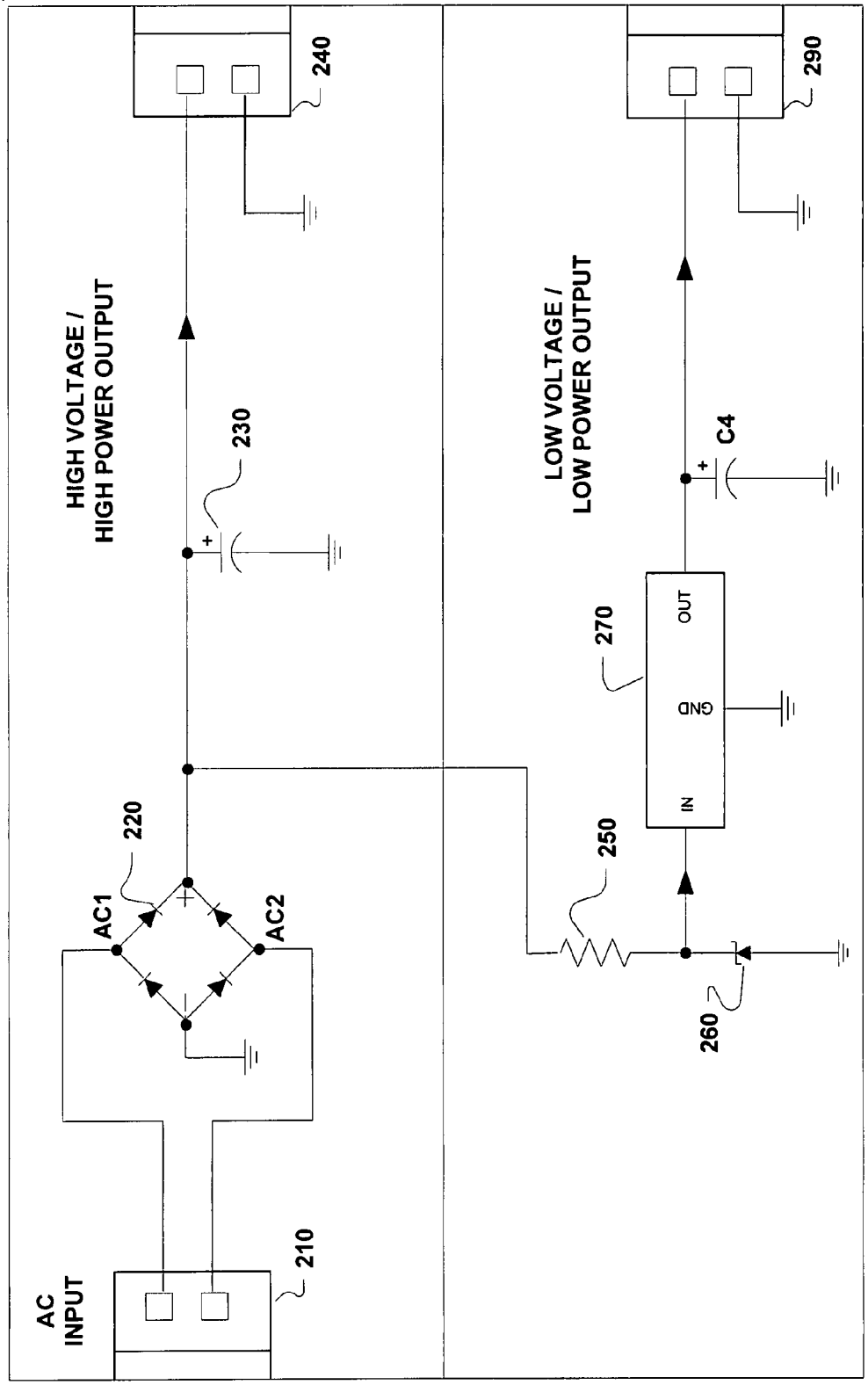
FIG. 2 is a schematic diagram of a conventional power circuit that generates a high-voltage output in tandem with a low-voltage output using a resistive voltage drop and a series regulator.
Figure 3:
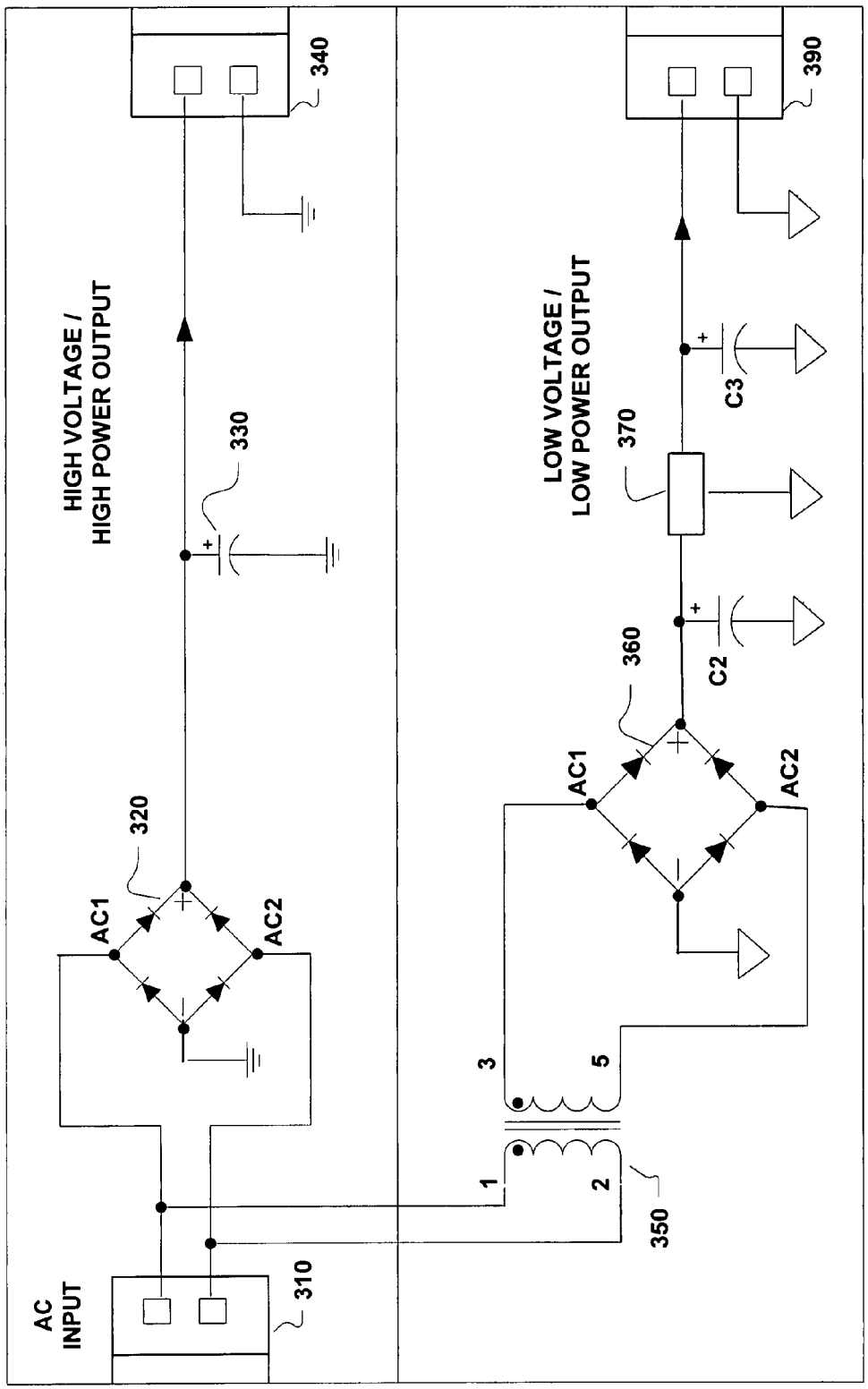
FIG. 3 is a schematic diagram of a conventional power circuit that generates a high-voltage output in tandem with a low-voltage output using a transformer and a series linear regulator.
Figure 4:
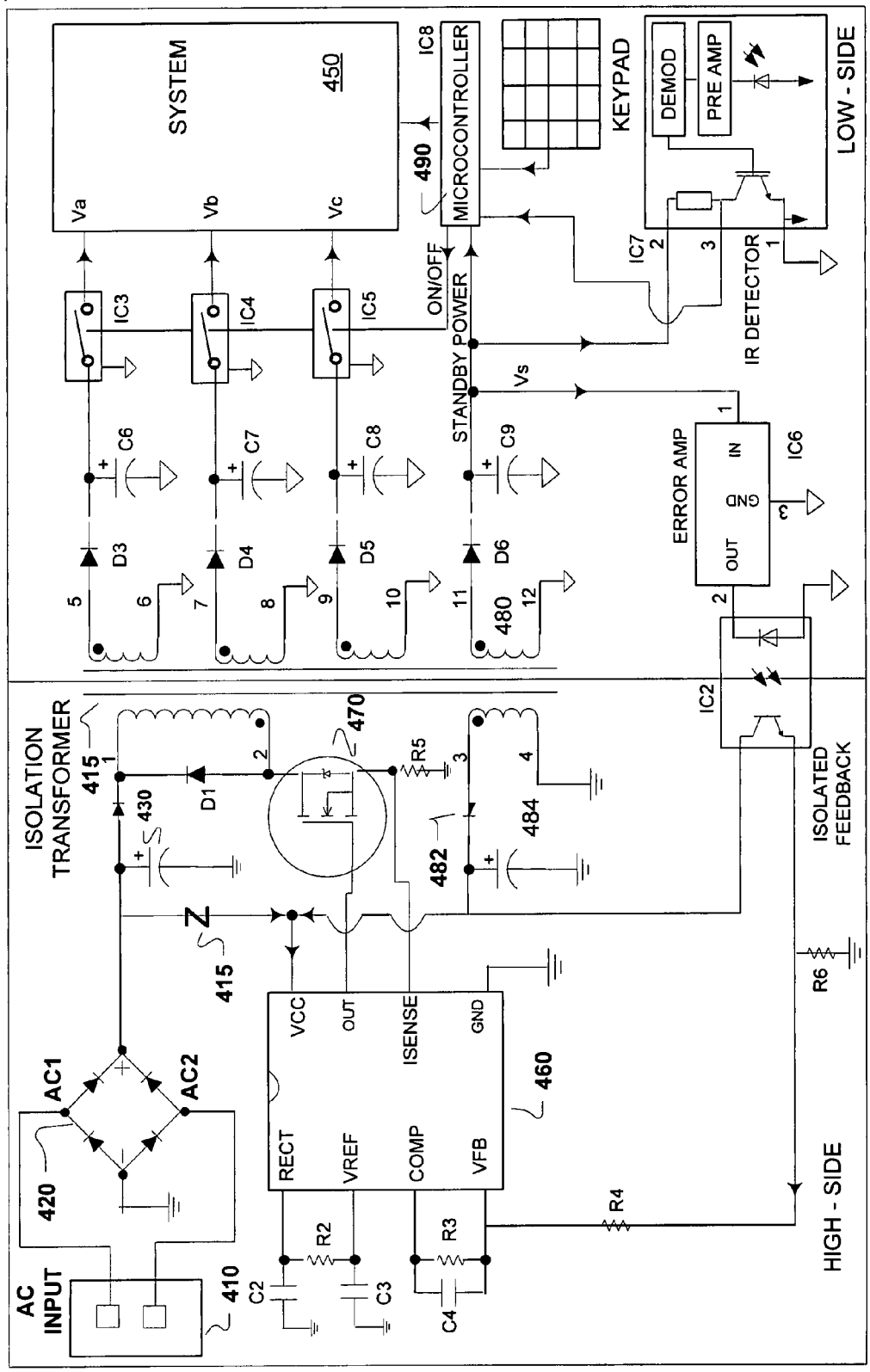
FIG. 4 is a schematic diagram of a conventional power circuit for a switching power supply employing a resistive voltage drop to generate a low voltage start up supply power.

The power dissipation of the power circuit 600 is greatly reduced, for example, in comparison with the power circuit 100 of FIG. 1. For an input voltage of 230 volts, the rectified high voltage is approximately 325 volts. For a required output of 10V DC at a current of 5 milliamps, the power dissipation in zener diode 660 is approximately 56 milliwatts. This amount is much less than the 1 watt, and is much less than 0.3 watts, a recommended standard in some countries.

Figure 7:
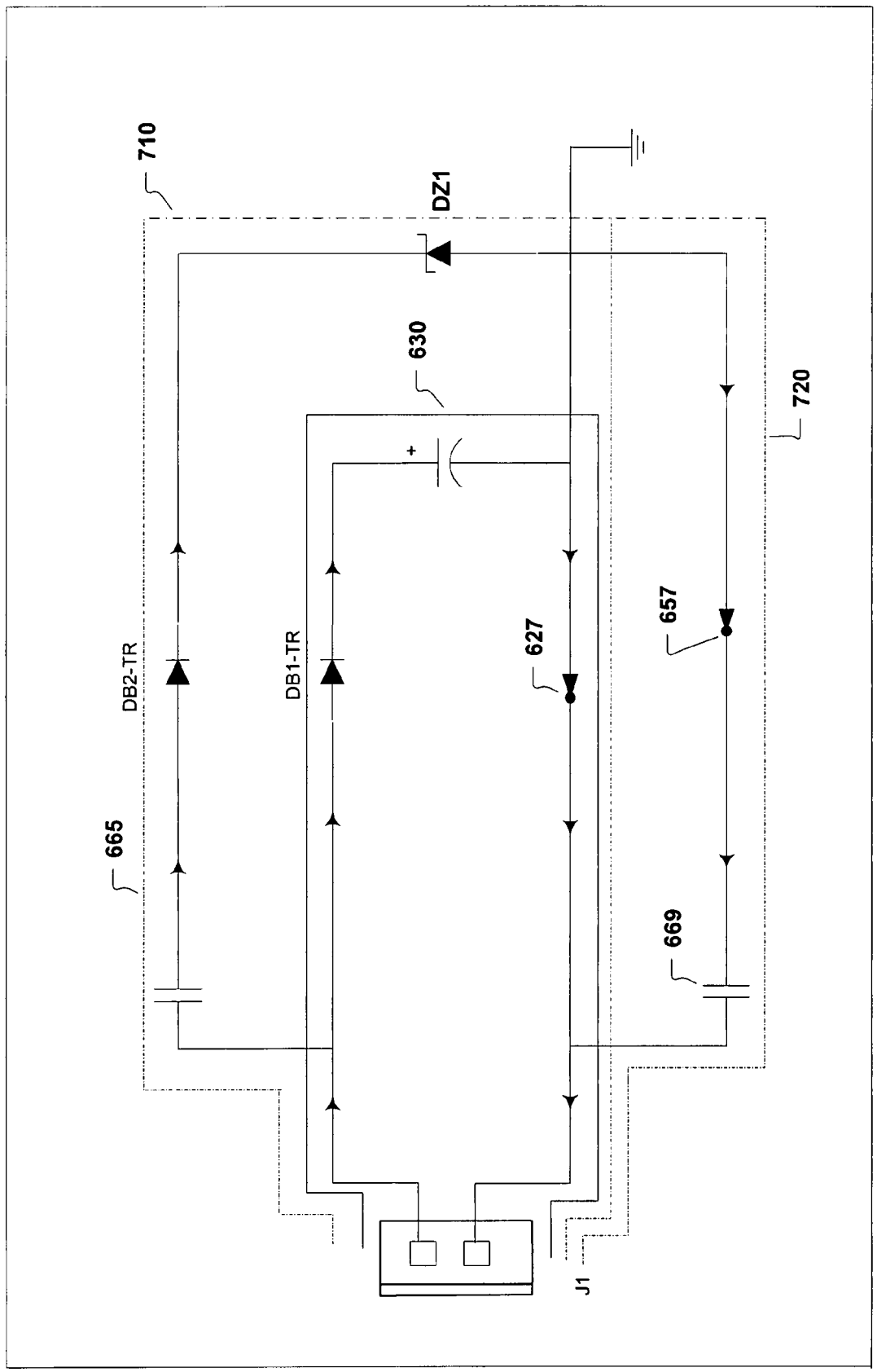
FIG. 7 is a diagram 700 illustrating the current flow through the power circuit of FIG. 6, in accordance with one embodiment of the present invention.

FIG. 7 is a diagram 700 illustrating the current flow through the power circuit 600 in the previous example, in accordance with one embodiment of the present invention. The diagram 700 shows the two alternative paths. The first alternative path 710 is the dotted line. The second alternative path 720 is the dash-dotted line. As shown in FIG. 7, the power circuit 600 closes through the path 710 through node 627, or through the path 720 through node 657 in series with capacitor 669. Since path 720 is longer, the circuit will close mainly through path 710.

Furthermore, the path 710 carries a larger current while charging the capacitor 630. The current of path 710 is orders of magnitude larger than the current of path 720. Depending on the voltage drop across the two diodes of the diode bridge rectifier circuit 620 in path 710, the difference between them is applied to the capacitor 669.

As such, the capacitor 665 will charge to a peak equal to the AC input voltage maximum instantaneous value, while the voltage across capacitor 669 is charged to a negative 92 millivolts, which is negligible. In addition, during the second phase of the AC voltage at the connector 610, when the polarity is changed, the roles of the capacitors 665 and 669 are changed.

Figure 8:
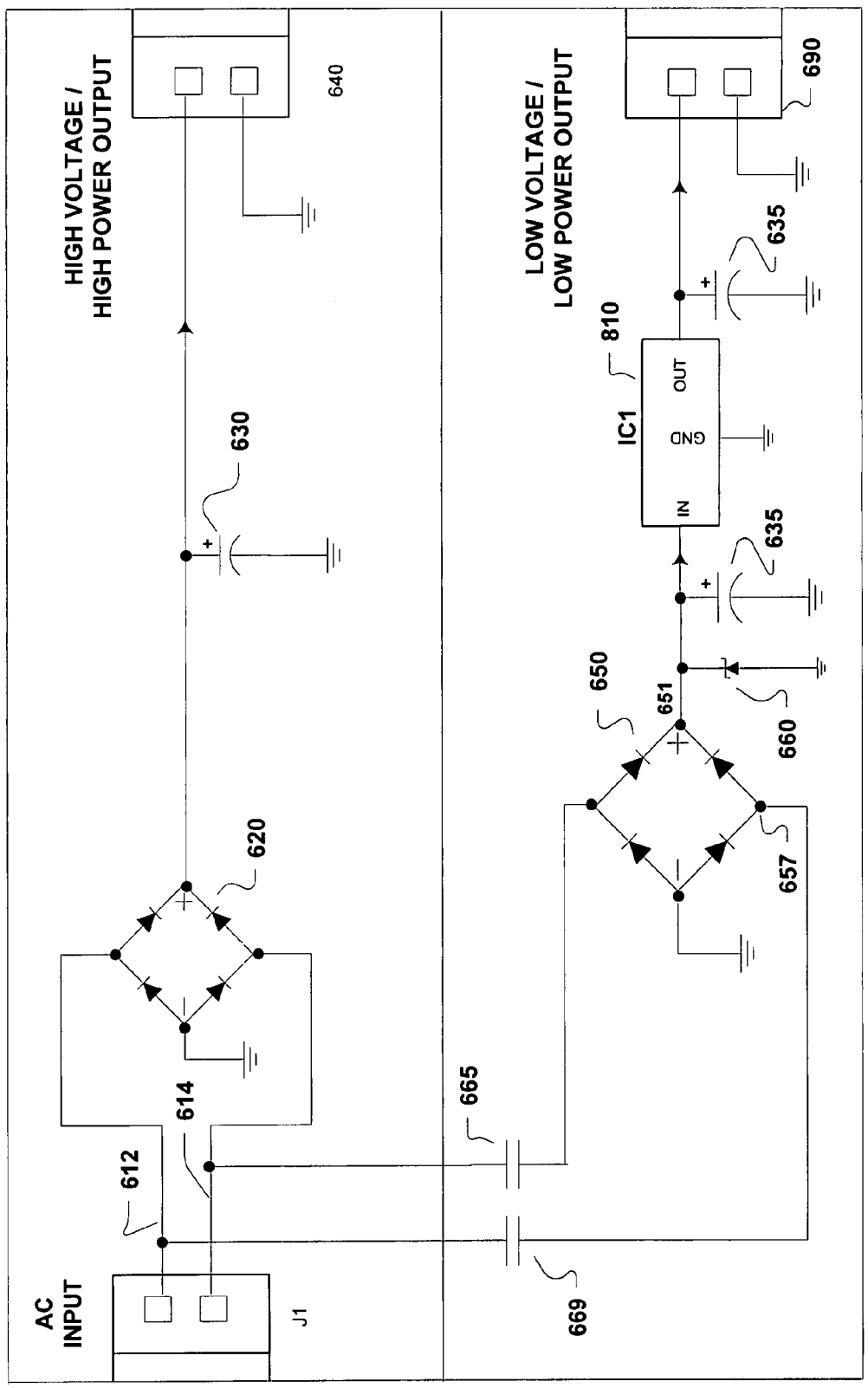
FIG. 8 is a schematic diagram of a power circuit that is capable of generating a high power output in tandem with a low power output suing a capacitive voltage drop and a shunt regulator, in accordance with one embodiment of the present invention.

FIG. 8 is a schematic diagram of a power circuit that is capable of generating a high power output in tandem with a low power output using a capacitive voltage drop and a shunt regulator, in accordance with one embodiment of the present invention.

The power circuit 800 is similar to the power circuit 600 of FIG. 6 with the addition of the linear regulator circuit 810. The addition of the linear regulator circuit 810 improves the quality of the output voltage by regulating the voltage of the low voltage signal at output node 651. That is, the low voltage signal is more stable and there is less voltage ripple.

The optional zener diode 660 protects the circuit in case the load is removed or is too light. During normal operation, when there is a load of at least a minimum value, the current through the zener diode 660 will almost be null. For example, the output voltage required at AC input 614 is 5 volts at 10 milliamps, or a total of 50 milliwatts. The linear regulator circuit 810 is designed to work with a minimum dropout voltage of 1 volt, since it is a low dropout output (LDO) type. At the minimum voltage at the AC inputs of 85 volts, the voltage on the input of the linear regulator 810 is configured to be approximately 6 volts. When the AC input is at the highest allowable level (e.g., approximately 265 volts) the voltage at the linear regulator 810 may increase by a factor of 265/85, or 3.12 times, to about 18.72 volts. The voltage drop on the LDO is in this case 18.72 volts–5 volts, or 13.72 volts. At a current of 5 milliamps, the power dissipation on the regulator is about 68.6 milliwatts, which is still less than 0.3 watts.

In another embodiment, a switching shunt regulator circuit is coupled in parallel to the zener diode 660 of FIG. 8. The switching shunt regulator circuit provides for increased control of the power of the low voltage power signal that is provided to the microcontroller. The power circuit including the switching shunt regulator has a very wide dynamic range, which allows it to work with a wide range of current. That is the power circuit maintains very good regulation from no load to maximum load conditions. In addition, the power circuit generates a more accurate low power output voltage and can be readily set. Additionally, the power circuit has less ripple. Also, the capacitor 665 can be reduced in size.

FIG. 9 is a schematic diagram of a power circuit 900 that is capable of generating a high power output in tandem with a low power output using a capacitive voltage drop and a programmable zener diode, in accordance with one embodiment of the present invention. The power circuit 900 is similar to the power circuit 600 of FIG. 6, except for the programmable zener configuration 910. That is, the programmable zener diode is coupled to the output node and to the ground for clamping the low voltage output at node 651.

In another embodiment, an optional voltage divider is coupled to the output node 651 of FIG. 9, to the zener diode 660 and to ground. Adjusting the ratios of the resistors (963 and 965) of the voltage divider determines the voltage at which the zener diode 660 clamps the output voltage at node 651.

Figure 10A:
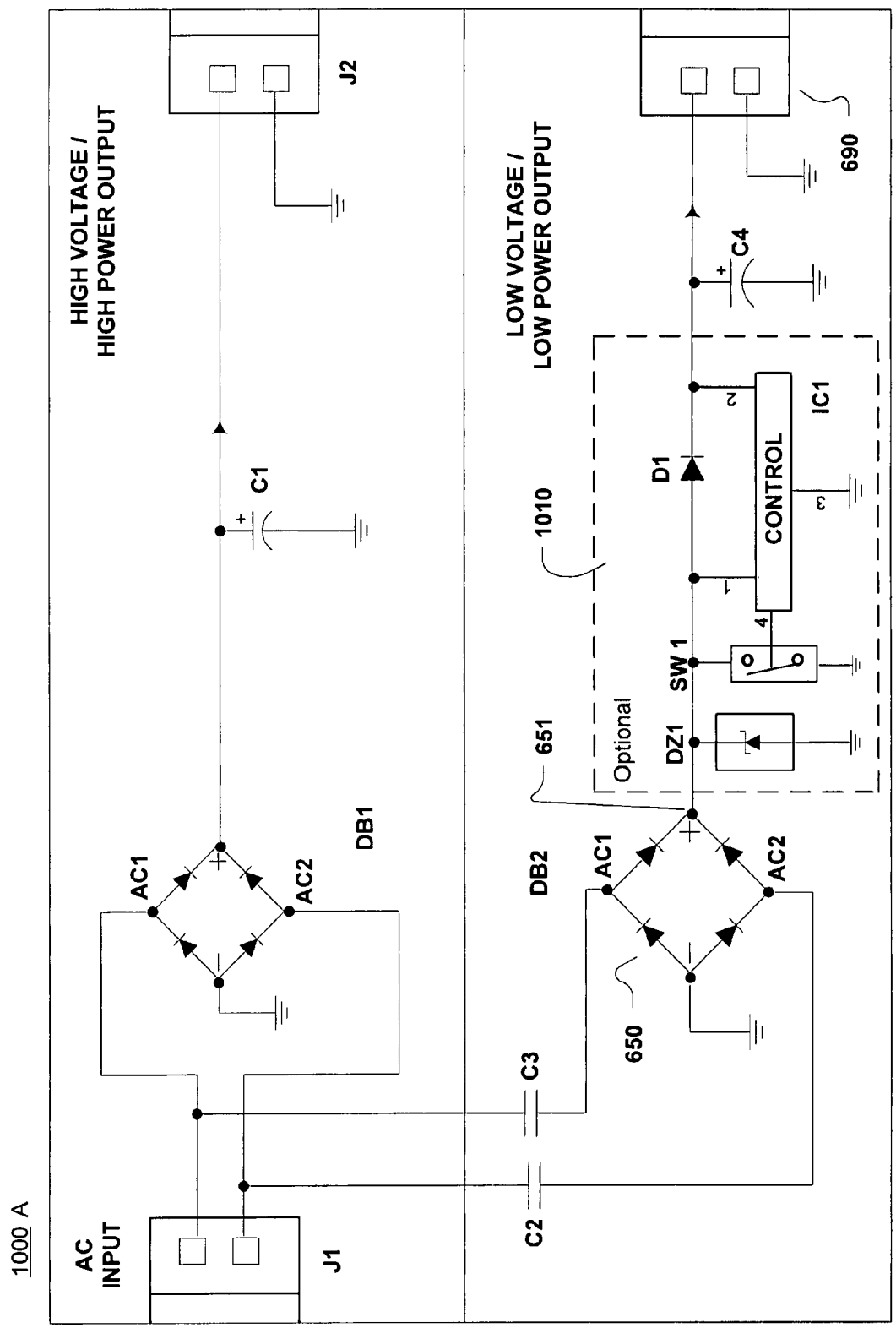
FIG. 10A is a schematic diagram of a power circuit 1000A that generates a non-isolated low voltage power supply in standby conditions, in accordance with one embodiment of the present invention.

FIG. 10A is a schematic diagram of a power circuit 1000A that generates non-isolated low voltage power in standby conditions, in accordance with one embodiment of the present invention. More specifically, the power circuit 1000A generates a high power output in tandem with a low power output using a capacitive AC voltage drop and a switching shunt regulator.

The power circuit 1000A is similar to the power circuit 600 of FIG. 6, with the addition of the switching shunt regulator circuit 1010. For instance, the connector 610 is coupled to a high voltage power circuit for generating a high voltage power signal to a load. In addition, a diode bridge rectifier circuit 650 provides the low voltage power signal at node 651 to a microcontroller coupled to the connector 690. In addition, the switching shunt regulator circuit 1010 is coupled to output node 651, to ground, and to the connector 690. As such, the switching shunt regulator circuit 1010 controls the power applied to the microcontroller coupled to the connector 690.

The switching shunt regulator circuit 1010 shorts the output at node 651 to ground when engaged. Effectively, this shorts the output across the two capacitors 665 and 669. That is, when the power circuit 1000A senses that there is too much power being applied to the load coupled to the connector 690, the short is applied at a high rate. That is, the switch SW1 is turned on and off at a high rate. Since the short is effectively across two capacitors, in series, no power is dissipated. As a result, when the switching shunt regulator circuit 1010 is operating, the low voltage output signal at node 651 is passed half of the time, thereby lowering the power applied to the connector 690.

Figure 10B:
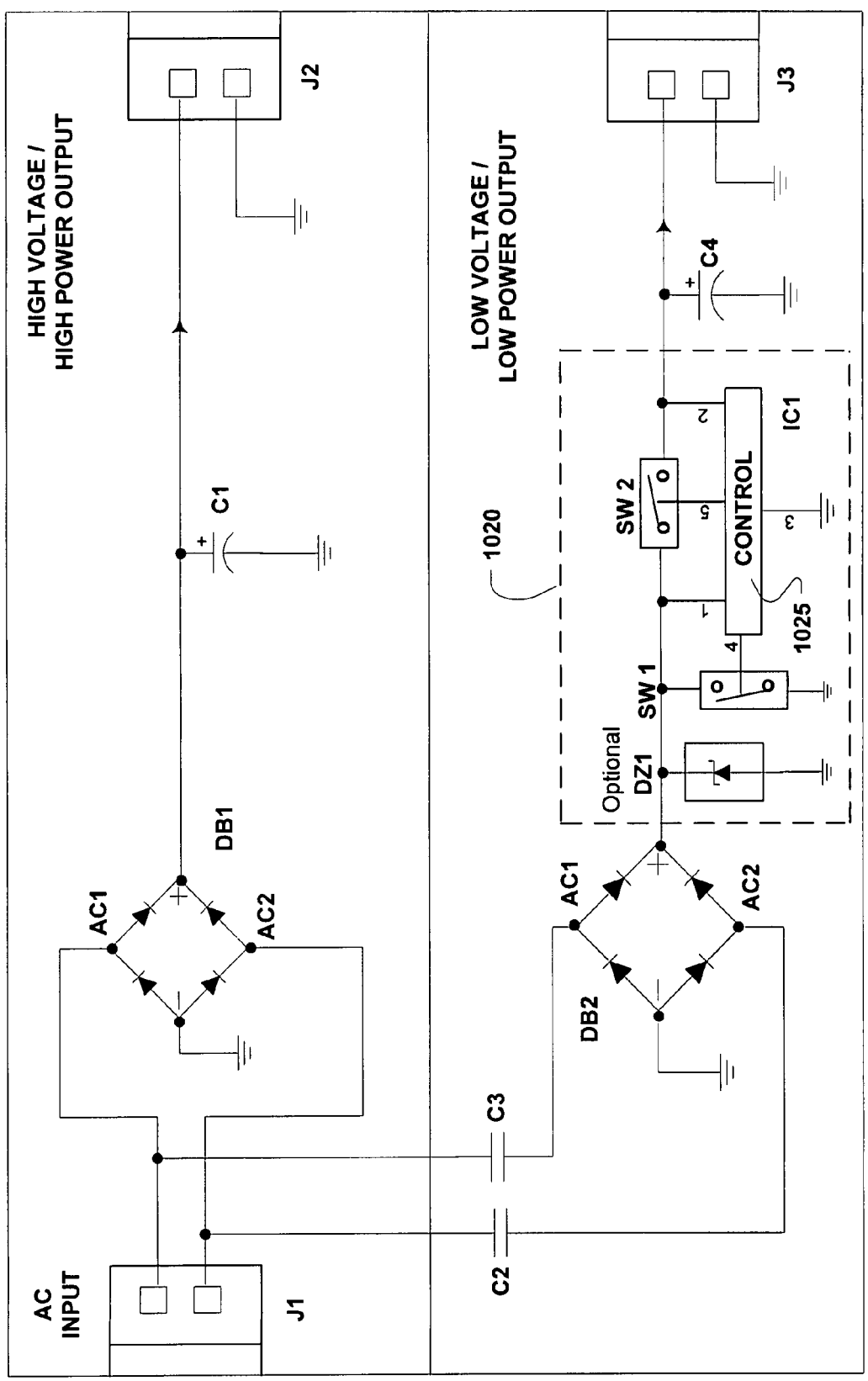
FIG. 10B is a schematic diagram of a power circuit 1000B that generates a non-isolated low voltage power supply in standby conditions, in accordance with one embodiment of the present invention.

FIG. 10B is a schematic diagram of a power circuit 1000B that generates non-isolated low voltage power in standby conditions, in accordance with one embodiment of the present invention. More specifically, the power circuit 1000B generates a high power output in tandem with a low power output using a capacitive AC voltage drop and a switching shunt regulator. The power circuit 1000B is an improvement in efficiency over power circuit 1000A, in one embodiment.

The power circuit 1000B is similar to the power circuit 1000A of FIG. 6, with the substitution of the switching shunt regulator circuit 1020 for the switching shunt regulator circuit 1010. More particularly, the switching shunt regulator circuit 1020 includes an additional switch SW2.

In the power circuit 1000B, as described previously, the connector 610 is coupled to a high voltage power circuit for generating a high voltage power signal to a load. In addition, a diode bridge rectifier circuit 650 provides the low voltage power signal at node 651 to a microcontroller coupled to the connector 690. In addition, the switching shunt regulator circuit 1020 is coupled to output node 651, to ground, and to the connector 690. That is, switch SW1 is coupled in parallel to the zener diode 660. A second switch SW2 is coupled in series to the output node 651 and the connector 690. The controller 1025 of the switching shunt regulator circuit 1020 is coupled to switches SW1 and SW2. As such, the switching shunt regulator circuit 1020 controls the power applied to the microcontroller coupled to the connector 690.

To reduce the amount of energy being applied to the load on the connector 690, the switches SW1 and SW2 in the switching shunt regulator circuit 1020 are switched on and off in opposite phase at a high rate. That is, when switch SW2 is ON, switch SW1 is OFF. Alternatively, when switch SW2 is OFF, switch SW1 is ON.

The switching shunt regulator circuit 1020 chops the output signal at node 651 at a much higher frequency than the diode bridge rectifier circuit 650. As a result, when the switching shunt regulator circuit 1020 is operating, the low voltage output signal at node 651 is passed half of the time thereby lowering the power applied to the connector 691.

Accordingly, various embodiments of the present invention disclose a power circuit that generates non-isolating low voltage power in standby conditions. Embodiments of the present invention are able to generate a low voltage power supply that is significantly lower than 1 watt (e.g., less than 0.3 watts) in tandem with a high voltage output. In many cases, a lower voltage and lower power level output is required in tandem with a high voltage output for a power circuit that provides power to an electronic device. The lower voltage may be required, for example to start-up the switching power supply circuit from a standby condition.

Embodiments of the present invention, a power circuit for the generation of a low voltage signal from a non-isolated power supply are described. While the invention is described in conjunction with the preferred embodiments, it is understood that they are not intended to limit the invention to these embodiments. On the contrary, the invention is intended to cover alternatives, modifications and equivalents, which may be included within the spirit and scope of the invention as defined by the appended claims. Furthermore, in the detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

What is claimed is:

1. A power circuit generating a non-isolating low voltage power supply in standby, comprising:
    an AC connector generating a first AC input and a second AC input, wherein said second AC input is opposite in phase from said first AC input;
    a first diode bridge rectifier circuit coupled at separate nodes to said first AC input, said second AC input, and a ground, wherein said first diode bridge rectifier at a first output node provides a high voltage power signal to a first load;
    a second diode bridge rectifier circuit coupled at separate nodes to said first AC input, said second AC input, and said ground, said second diode bridge rectifier circuit comprising a first diode, a second diode, a third diode and a fourth diode, wherein said second diode bridge rectifier at a second output node provides a low voltage power signal to a second load, said second output node between the cathode of said first diode and the cathode of said second diode;
    a first capacitor coupled in series with said first AC input and a first node of said second diode bridge rectifier circuit for dropping a first voltage of said first AC input, said first node between the anode of said first diode and the cathode of said fourth diode, wherein said first capacitor is connected directly to said first node;
    a second capacitor coupled in series with said second AC input and a second node of said second diode bridge rectifier circuit for dropping a second voltage of said second AC input, said second node between the anode of said second diode and the cathode of said third diode, wherein said second capacitor is connected directly to said second node;
    a zener diode coupled to said second output node, wherein the anode of said zener diode is connected directly to ground and wherein the cathode of said zener diode is connected directly to said second output node between said first and second diodes; and
    a switching shunt regulator circuit coupled in parallel with said zener diode and to said second output node, to ground and to said second load and comprising a first switch, said switching shunt regulator circuit connected directly to said second output node and operable for controlling the voltage of said low voltage power signal to said second load, wherein said switching shunt regulator circuit shorts the output at said second output node to ground when engaged, thereby also shorting the output across said first and second capacitors.

2. The power circuit of claim 1, further comprising:
    a third capacitor coupled to said first output node and said ground for reducing ripple in said high voltage power signal to said first load; and
    a fourth capacitor coupled to said switching shunt regulator circuit and said ground for reducing ripple in said low voltage power signal to said second load.

3. The power circuit of claim 2 further comprising a diode coupled between said second output node and said fourth capacitor; wherein with said switching shunt regulator circuit turned on, said diode prevents discharge of said fourth capacitor through said first switch and current is shunted through said zener diode, resulting in a circuit path that includes only said first capacitor, said second capacitor and said second diode bridge rectifier circuit.

4. The power circuit of claim 1, further comprising a voltage divider coupled to said second output node, said ground and said zener diode for adjusting said low voltage power signal.

5. The power circuit of claim 1, wherein said zener diode comprises a programmable zener diode.

6. The power circuit of claim 1, wherein said switching shunt regulator circuit comprises a controller coupled to said second output node, said zener diode, said first switch and to said ground, said controller for controlling said first switch.

7. The power circuit of claim 1, wherein said switching shunt regulator circuit further comprises:
    a second switch coupled in series to said second output node and said load; and
    a controller coupled to said first and second switches, wherein said first and second switches operate in opposite phase relative to one another.

8. The power circuit of claim 7 further wherein said second switch prevents discharge of said fourth capacitor through said first switch and current is shunted through said zener diode, resulting in a circuit path that includes only said first capacitor, said second capacitor and said second diode bridge rectifier circuit.

9. A power circuit for generating a non-isolated low voltage power supply in standby, comprising:
    an AC connector generating a first AC input and a second AC input, wherein said second AC input is opposite in phase from said first AC input;
    a high voltage power circuit coupled to said first AC input, said second AC input, and a ground for generating a high voltage power signal to a load;
    a first diode bridge rectifier circuit coupled at separate nodes to said first AC input, said second AC input, and said ground, said first diode bridge rectifier circuit comprising a first diode, a second diode, a third diode and a fourth diode, wherein said first diode bridge rectifier at a first output node provides a low voltage power signal to a microcontroller, said first output node between the cathode of said first diode and the cathode of said second diode;
    a first capacitor coupled in series with said first input and a first node of said first diode bridge rectifier circuit for reducing a first voltage of said first AC input, said first node between the anode of said first diode and the cathode of said fourth diode, wherein said first capacitor is connected directly to said first node;
    a second capacitor coupled in series with said second input and a second node of said first diode bridge rectifier circuit for reducing a second voltage of said second AC input, said second node between the anode of said second diode and the cathode of said third diode, wherein said second capacitor is connected directly to said second node;
    a zener diode coupled to said first output node, wherein the anode of said zener diode is connected directly to ground and wherein the cathode of said zener diode is connected directly to said first output node between said first and second diodes;
    a switching shunt regulator circuit coupled in parallel with said zener diode and connected directly to said first output node and said ground and between said first output node and said microcontroller, said switching shunt regulator circuit comprising a first switch and operable for controlling a power of said low voltage power signal to said microcontroller, wherein said switching shunt regulator circuit shorts the output at said second output node to ground when engaged, thereby also shorting the output across said first and second capacitors; and a second diode bridge rectifier circuit coupled at separate nodes to said first AC input, said second AC input, and said ground, wherein said second diode bridge rectifier at a second output node provides said high voltage power signal to said load.

10. The power circuit of claim 9, wherein said switching shunt regulator circuit further comprises a controller coupled to said first output node, said zener diode circuit, said first switch, and to said ground for controlling said first switch.

11. The power circuit of claim 9, wherein said switching shunt regulator circuit further comprises:

a second switch coupled in series to said first output node and said load; and a controller coupled to said first and second switches, wherein said first and second switches operate in opposite phase relative to one another.

12. The power circuit of claim 11 wherein said second switch prevents discharge of said third capacitor through said first switch and current is shunted through said zener diode, resulting in a circuit path that includes only said first capacitor, said second capacitor and said first diode bridge rectifier circuit.

13. The power circuit of claim 9, wherein said high voltage power circuit further comprises:

a third capacitor coupled to said second output node and said ground for reducing ripple in said high voltage power signal.

14. The power circuit of claim 9, further comprising:

a third capacitor coupled to said first output node in parallel with said switching shunt regulator circuit for reducing ripple in said low voltage power signal.

15. The power circuit of claim 14 further comprising a diode coupled between said first output node and said third capacitor; wherein with said switching shunt regulator circuit turned on, said diode prevents discharge of said third capacitor through said first switch and current is shunted through said zener diode, resulting in a circuit path that includes only said first capacitor, said second capacitor and said first diode bridge rectifier circuit.

* * * * *